Aug. 19, 1930.　　　C. J. ROBERTSON　　　1,773,696
REVERSING MECHANISM
Filed June 19, 1929　　　3 Sheets-Sheet 1

Aug. 19, 1930.  C. J. ROBERTSON  1,773,696
REVERSING MECHANISM
Filed June 19, 1929  3 Sheets-Sheet 2

Inventor.
Charles J. Robertson
by _____ atty

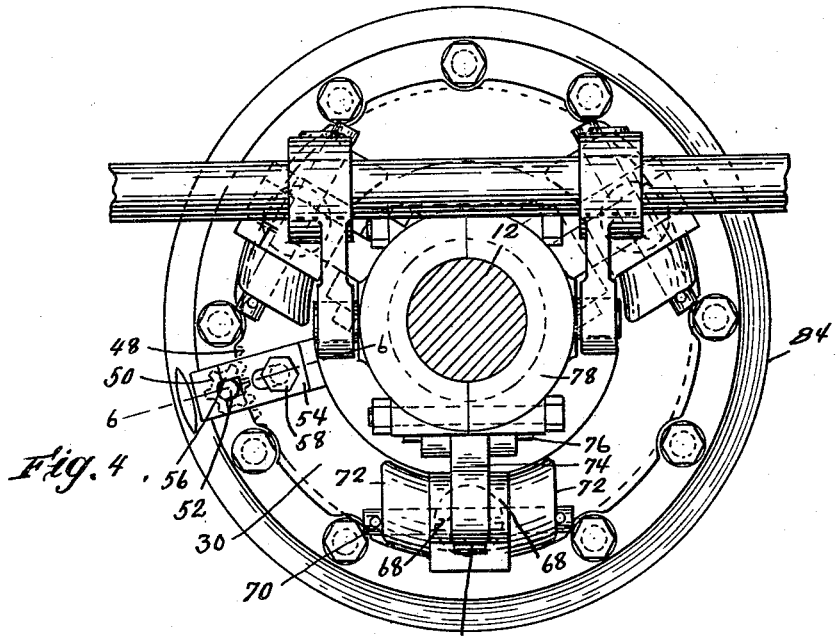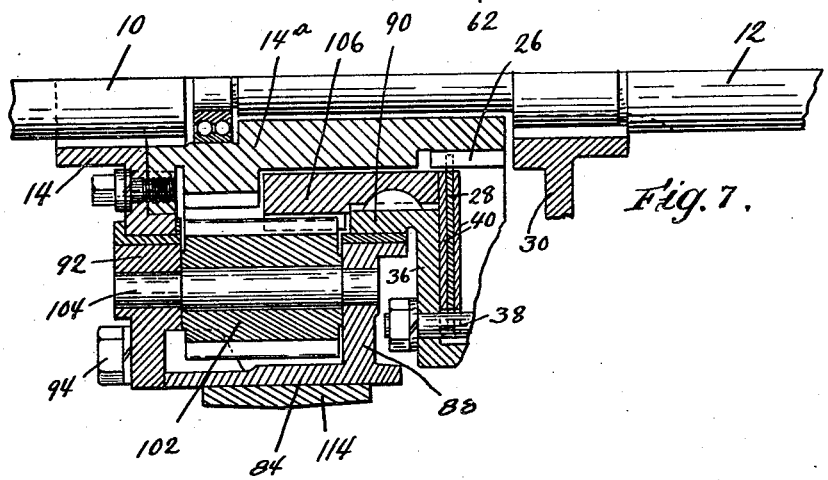

Patented Aug. 19, 1930

1,773,696

UNITED STATES PATENT OFFICE

CHARLES J. ROBERTSON, OF TAUNTON, MASSACHUSETTS, ASSIGNOR TO EVANS STAMPING AND PLATING COMPANY, OF TAUNTON, MASSACHUSETTS, A CORPORATION OF MASSACHUSETTS

REVERSING MECHANISM

Application filed June 19, 1929. Serial No. 372,174.

This invention relates to reversing mechanisms especially adapted for boat propulsion to connect the driving and driven shafts for forward and also for reverse rotation and also to disconnect said shafts so that the driving or engine shaft can rotate freely without rotating the propeller or driven shaft. This particular invention has reference to planetary reversing mechanisms.

A planetary reversing mechanism, or gearing, comprises planetary gears and a brake mechanism to secure reverse drive and clutch mechanism to secure forward drive.

One of the objects of the present invention is the provision of a reversing mechanism having an improved form of clutch mechanism to connect the shafts directly for forward drive and to exclude the reversing gearing.

In a reversing gearing of the type to which this invention relates, it is considered essential to have the clutch mechanism located in the rear of the reversing gearing, so that the clutch mechanism and the actuating mechanism are in close relation with each other.

With such an arrangement, it has been difficult, heretofore, to obtain a construction of reversing mechanism wherein the driving and driven shafts were directly connected for forward drive, because of the interposition of the planetary gearing elements between the driving shaft and the clutch mechanism.

An object of the present invention is the provision of a reversing mechanism of the above type wherein a direct connection is established between the elements of the reversing gearing from the driving shaft to the clutch mechanism and also wherein there is a connection from the gearing elements around the clutch mechanism to the driven shaft so that the two shafts can be connected directly for forward drive and the planetary gearing elements excluded, and also so that the shafts can be connected for reverse drive through the planetary gearing elements and the clutch mechanism excluded.

With the usual type of planetary reversing mechanism, it is necessary to disassemble the mechanism to permit the propeller shaft to be moved rearwardly.

It is an object of the present invention to provide a reversing mechanism wherein the parts of the mechanism are so arranged that the propeller shaft can be moved rearwardly without the necessity for disassembling the mechanism.

Specifically, it is an object of the present invention to provide a reversing mechanism wherein the parts carried by the propeller shaft have an axially-disconnectible, or clutch, connection with the cooperating parts carried by the driving shaft so that the parts can be separated by a rearward movement of the propeller shaft.

A further object of the invention is the provision of a reversing mechanism wherein the reversing gearing is carried by the driving shaft and the clutch mechanism is carried by the propeller shaft, and wherein the two mechanisms are arranged in disengageable clutching connection and can be disengaged without the necessity for first disassembling the reversing mechanism.

A further object of the invention is the provision of a simple type of planetary reversing mechanism and capable of giving a high speed reverse drive, with a low rotative speed of the planetary pinion gears, and a direct forward drive, wherein the planetary gearing is excluded from the line of drive.

Another object is the provision of a planetary reversing mechanism of the above type wherein the axial clutch-engaging pressure and also the rotative friction clutching torque vibrations are restricted to one driving and one driven member, by the use of spur gears only and without the use of clutch operating members which are extended through the planetary gearing.

A further object is generally to improve the construction and operation of reversing mechanisms.

Fig. 1 is a longitudinal elevation, partly in section, of the reversing mechanism embodying the present invention.

Fig. 2 is a section along line 2—2 of Fig. 1.
Fig. 3 is a section along line 3—3 of Fig. 1.
Fig. 4 is an elevation of the rear end of the mechanism of Fig. 1.
Fig. 5 is a sectional detail of one of the clutch operating pins and the adjusting plate therefor.

Fig. 6 is a sectional detail taken along line 6—6 of Fig. 4, and illustrating the mechanism for rotating the clutch adjustment plate.

Fig. 7 is a longitudinal sectional elevation of a modified arrangement of the reverse mechanism.

Figure 1:
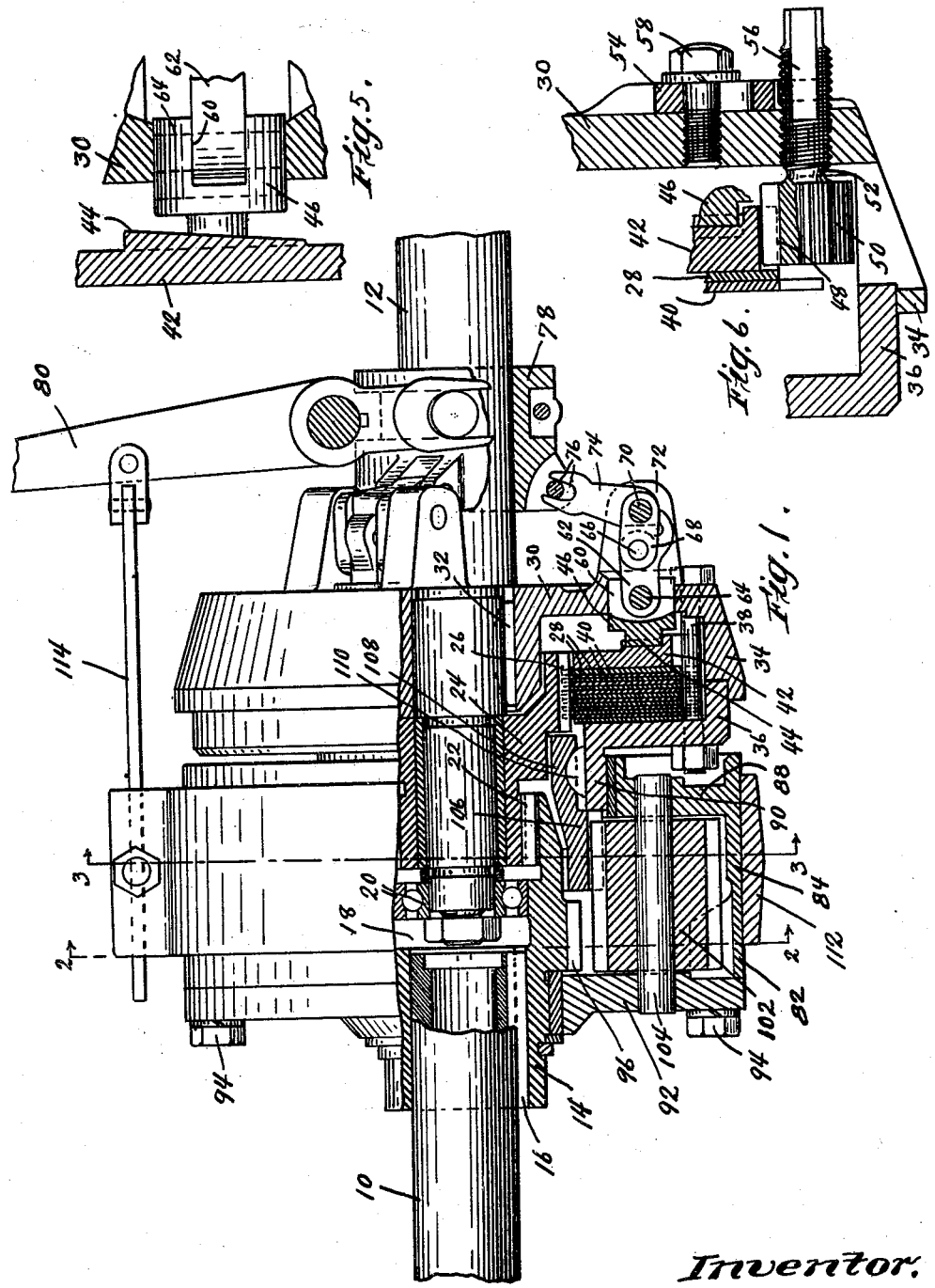

The reversing mechanism here shown is adapted to connect a driving or engine shaft 10 and the driven or propeller shaft 12 for forward drive and also for reverse drive and also to disconnect the driving connection between the shafts so that the driving shaft can rotate freely independently of the driven shaft.

A hub 14 is fixed by a suitable key 16 to the rear end of the driving shaft and extends rearwardly thereof over the forward end of the driven shaft and has an internal recess 18 that is provided with an anti-friction pilot bearing 20 in which the reduced forward end of the driven shaft is rotatably supported. Said hub extends rearwardly beyond said bearing and is provided with internal axially-extended splines or clutch teeth 22 which mesh with corresponding splines or clutch teeth on a clutch hub 24 journalled on an intermediate section of the driven shaft. Said hub at its rear end is provided with peripheral clutch plate engaging teeth or splines 26 that are in driving engagement with a set of radially outstanding clutch plates 28. A clutch plate carrier surrounds said clutch plates and has a radially-outstanding rear end wall 30 which is fixed by a key 32 to the driven shaft immediately in the rear of the hub 24. Said plate has a forwardly extended cylindrical or drum portion 34 to which a radially inwardly extended front cover plate 36 is removably secured by means of the bolts 38. Said plates 30 and 36 are spaced axially and cooperate to form a clutch plate enclosure. A set of clutch plates 40 are carried by the clutch plate carrier and mesh with alternate driving clutch plates 28 and have peripheral notches in which the bolts 38 are received whereby to establish driving connection between said clutch plates 40 and the clutch plate carrier. Thus, when the clutch plates are brought into frictional engagement, the shafts 10 and 12 are connected directly for forward drive.

The clutch mechanism is set or the plates are pressed together by clutch actuating mechanism which includes a relatively thick pressure, or clutch-adjustment plate 42 which constitutes one of the set of clutch plates 40. Said pressure plate is provided on its rear face with a plurality of equally spaced inclined ledges 44, three being here shown, see especially Figs. 1 and 5, against which thrust pins 46 bear. Said thrust pins are axially movable in passages in the rear end plate 30 and are moved axially forward to set the clutch. The inclined ledges of said pressure plate provide means to take up wear in the clutch. To this end, said plate 42 is rotatable to bring thicker portions of the ledges under the pins as wear occurs. To this end, the periphery of said pressure plate, see especially Fig. 6, is provided with gear teeth 48 which mesh with a spur gear 50 carried by a shaft 52 which is screw-threaded in the end wall 30. Thus, by rotating the shaft the pressure plate 42 can be rotated to vary the thickness of the ledges under the thrust pins. The shaft 52 is held in set position by a forked plate 54 which straddles the shaft 52 and engages with diametrically opposed flat faces 56 thereof. The locking plate can be removed from the aforesaid relation for adjustment of the spur gear by slacking off the holding bolt 58 thereof.

The thrust pins are provided with radial slots 60 in their rear faces in which toggle links 62 are received, which toggle links are pivoted on pins 64 extended through the thrust pins and the slots thereof. The toggle links 62 are pivoted by pins 66 to the forwardly-extended arms 68 of bell crank levers which are pivoted on pins 70 carried by rearwardly extended ears 72 of the end plate 30. Said bell crank levers have inwardly-directed arms 74 that have pin and slot connections 76 with a sleeve 78 that is slidable axially on the driven shaft 12 in opposite directions to set and release the clutch. The sleeve is moved axially by means including an operating lever 80 which also constitutes means to set the mechanism for reverse drive.

Figure 2:
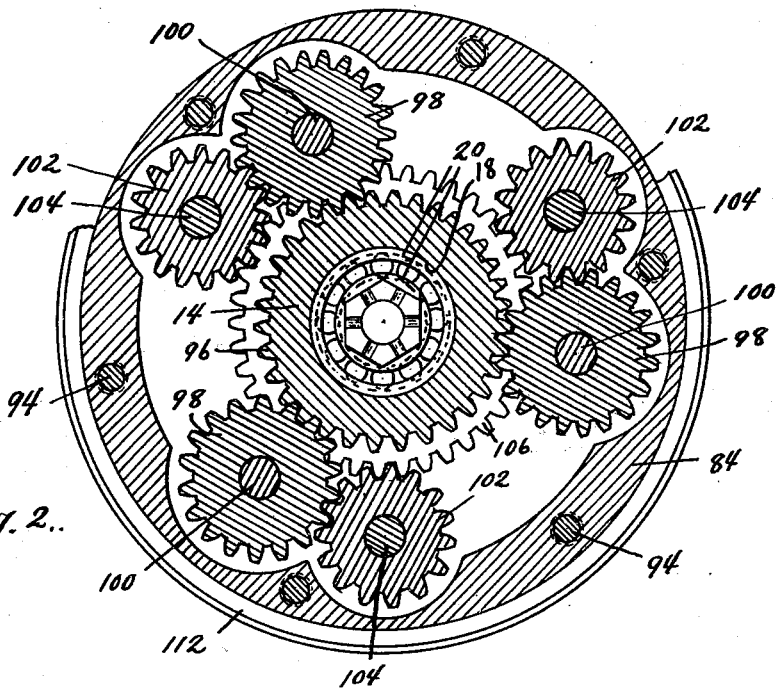
Figure 3:
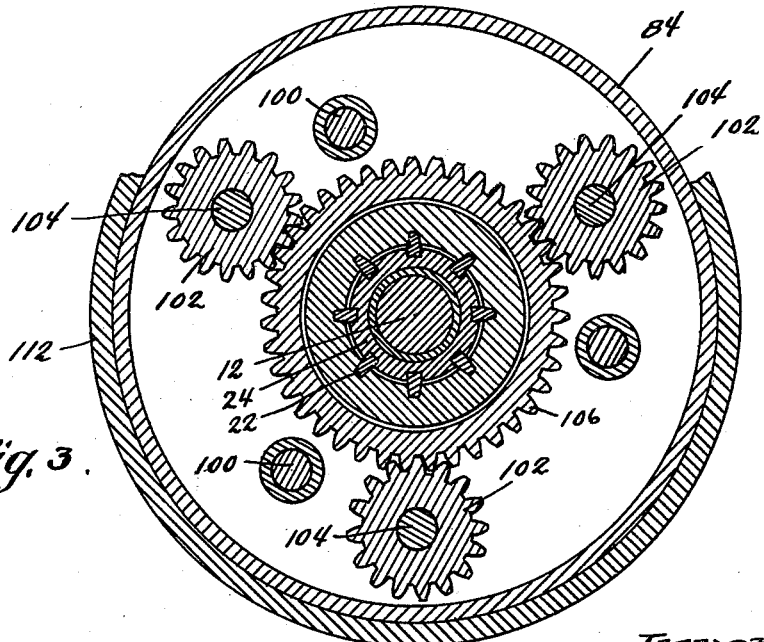

The planetary gearing by which reverse drive is secured is located forwardly of the clutch mechanism. Said gearing includes a gear carrier 82 which is located forwardly of the clutch mechanism and includes a cylindrical wall or drum 84 having an inwardly-extended radial flange or rear end plate 88 that has a rotatable support or bearing on the forwardly-directed hub 90 of the front plate 36 of the clutch casing. A radial front cover plate 92 is secured by bolts 94 to the front face of the cylindrical drum 82 and has a rotatable support or bearing on the driving hub 14. Said driving hub, within the pinion carrier, has external or spur gear teeth 96 thereon which mesh with large pinion gears 98, see Fig. 2, journalled on pins 100 extended through the gear carrier and carried by the end plates 92 and 88 thereof. Said large pinion gears are in mesh with small pinion gears 102 which are journalled on pins 104 also carried by said end plates 92 and 88. Said small pinion gears are in mesh with a spur gear 106 having a hub 108 which is extended rearwardly within the hub 90 and is fixed thereto by a key 110. Said gear is thus keyed to the driven shaft through the clutch casing. A brake mechanism including a brake band 112 encircles the drum 82, which constitutes a brake drum, and is adapted to hold the gear carrier stationary, whereby to set the mechanism for reverse drive. The brake band is contracted and expanded about the brake drum by means including the horizontal brake operating bar 114 which is connected with the operating lever 80.

With the arrangement above described, it will be evident that, when the clutch is set, the shafts 10 and 12 are caused to rotate conjointly and that, when the gear carrier is held stationary by the setting of the brake mechanism, the shafts are caused to rotate in the reverse direction. When both the reverse and the clutch mechanisms are free, the gearing is in neutral and the driving shaft can rotate without driving the driven shaft.

With the above arrangement, the clutch mechanism is carried mainly by the propeller shaft and the reversing mechanism is carried mainly by the driving shaft, and the driving connection between the clutch mechanism and the driving shaft passes between or within the reversing gearing. By reason of the arrangement above described, the propeller shaft 12 may be moved rearwardly in an axial direction without the necessity for disassembling the reversing mechanism, the spline connection between the hub 14 and the hub 24 permitting their axial disengagement, while the driven gear 106 is free to move rearwardly out of the larger bearing-opening in the rear wall of the gear carrier.

In the modification shown in Fig. 7, the driving shaft 10 has a hub 14 which is bolted detachably to a rearwardly-extended and axially-aligned hub 14ª that encircles the forward end of the driven shaft 12. The rear end of said hub 14ª is provided with spur gear teeth 26 or equivalent projections for engaging the clutch plates 28. The driven gear 106 surrounds the hub 14ª and is keyed to the hub 90 of the forward end plate 36 of the clutch casing, the rear wall 30 of which is keyed to the driven shaft. The maximum diameter of the gear 106 is less than the internal diameter of the bearing recess in the plate 88 of the planetary gearing carrier and the clutch driving teeth or projections 26 have a smaller diameter than the internal diameter of the gear 106. Thus, the propeller shaft can also be moved rearwardly in an axial direction and automatically effect the disengagement of the clutch plates with the driving hub 14ª and the driven gear 106 with the pinion gears 102 of the gear carrier.

I claim:

1. Reversing mechanism including the combination of aligned driving and driven shafts, gearing for connecting said shafts for reverse drive including a driving spur gear connected with said driving shaft, a driven spur gear, reversing pinion gears meshing with said spur gears, a loose carrier for said pinion gears, clutch mechanism for connecting said shafts directly for forward drive and excluding said reversing gearing including a clutch plate carrier located in the rear of said pinion carrier and said spur gears, clutch plates in said carrier some of which are connected therewith and others of which are connected with said driving shaft, clutch operating mechanism disposed in the rear of said clutch mechanism and having clutch plate operating means extended forwardly independently of said gears into and terminated in said clutch plate carrier, and a driving connection between said driven spur gear and said clutch plate carrier located between said pinion gear carrier and said clutch plates.

2. Reversing mechanism having reversing gearing in front and clutch mechanism in the rear, both being axially-aligned, a driving member extended through said reversing gearing into said clutch mechanism, a driving spur gear and a set of clutch plates connected with said driving member, a second and cooperative set of clutch plates, a driven carrier for said second set having a driven member surrounding said driving member and extended forwardly into said reversing gearing, a spur gear located in said reversing gearing and fixed to said driven member, planetary pinion gears surrounding and connecting both aforesaid spur gears, a pinion gear carrier, means to hold said carrier stationary for reverse drive, and operating mechanism to effect the engagement of said sets of clutch plates for forward drive.

3. Reversing mechanism including the combination of a driving member having spur gear teeth at the forward end and clutch plate engaging means at the rear end thereof, a driven member constituting a clutch plate carrier, clutch plates carried by said carrier and said clutch plate engaging means of said driving member, clutch operating mechanism located in the rear of said clutch plate carrier including means extended into said carrier in operative position with respect to said clutch plates, and reversing gearing connecting said driving member and clutch plate carrier for reverse drive including planetary pinion gears having a driving connection with said spur gear teeth, a planetary pinion gear carrier surrounding said driving member and said spur gear teeth, and a driven spur gear located within and meshing with said planetary pinion gears and carried by and having a driving connection with said clutch plate carrier.

4. Reversing mechanism including a driving member having clutch plate engaging means at its rear end, clutch plates carried thereby, a driven clutch plate carrier surrounding said clutch plates having clutch plates connected therewith which engage the aforesaid clutch plates, clutch operating mechanism disposed in the rear of said clutch plate carrier having clutch plate operating means which enter said carrier, reversing gearing located in front of said clutch plate carrier including planetary pinion gears having a driving connection with said driving member, a carrier for said pinion gears, a spur gear having a driving connection with said clutch plate carrier between the latter and said pinion gear carrier and meshing with said pinion gears, and means to set said gearing to establish an operative driving connection therethrough between said driving member and clutch plate carrier.

5. Reversing mechanism including aligned driving and driven shafts, a driving member connected with said driving shaft having clutch plate engaging means at its rear end, clutch plates carried thereby, a clutch plate carrier fixed to said driven shaft and surrounding said clutch plates and having clutch plates carried thereby in mesh with said aforesaid clutch plates, clutch operating mechanism disposed in the rear of said clutch plate carrier having operating means for said clutch plates extended forwardly into said carrier, reversing gearing connecting said shafts for reverse drive including planetary pinion gears surrounding said driving member, said driving member having spur gear teeth which are in mesh with said planetary pinion gears, a carrier for said planetary pinion gears, and a spur gear fixed to said clutch plate carrier extended forwardly over said driving member into said gear carrier and meshing with said planetary pinion gears.

6. Reversing mechanism including the combination of aligned driving and driven shafts, clutch mechanism connecting said shafts directly for forward drive including a driving member connected with said driving shaft and having clutch plate engaging means at its rear end, a clutch plate carrier connected with said driven shaft having spaced front and rear walls surrounding said clutch plate engaging means, sets of clutch plates located within said carrier and connected respectively with said carrier and with said clutch plate engaging means, clutch operating mechanism disposed in the rear of said clutch plate carrier having clutch plate operating means extended forwardly into said carrier, and reversing gearing connecting said shafts for reverse drive including spur gear teeth carried by said driving member forwardly of said clutch plate carrier, planetary pinion gears in mesh with said spur gear teeth, a pinion gear carrier surrounding said driving member, and a driven spur gear surrounding said driving member and meshing with said planetary pinion gears and having a fixed connection with the front wall of said clutch plate carrier.

7. Reversing mechanism as defined in claim 6 wherein said planetary pinion gear carrier has a rotatable bearing support on said driving member and also on said front wall.

8. Reversing mechanism including the combination of aligned driving and driven shafts, a driving hub fixed to said driving shaft and extended rearwardly thereof, a clutch plate hub surrounding said driven shaft and having a disengageable clutch connection with said driving hub, clutch plates carried by said clutch hub, a clutch plate carrier connected with said driven shaft and surrounding said clutch plates and having clutch plates which engage said aforesaid clutch plates, operating mechanism for said clutch mechanism, and reversing gearing connecting said shaft for reverse drive including planetary pinion gears surrounding said driving hub, said hub having spur gear teeth which mesh with said pinion gear, a pinion gear carrier for said pinion gears, and a spur gear surrounding said hub located within and arranged in mesh with said planetary pinion gears and having a driving connection with said clutch plate carrier.

9. Reversing mechanism including the combination of aligned driving and driven shafts, a driving hub fixed to said driving shaft and extended rearwardly thereof, a clutch hub surrounding said driven shaft and having a disengageable clutch connection with said driving hub, a clutch plate carrier fixed to said driven shaft and surrounding said clutch hub and having spaced front and rear walls, clutch plates carried by said clutch hub and said clutch plate carrier, clutch operating mechanism located in the rear of said clutch plate carrier having clutch plate operating means extended forwardly into said carrier, reversing gearing connecting said shafts for reverse drive including planetary pinion gears surrounding said driving hub, said driving hub having spur gear teeth which mesh with said planetary pinion gears, a carrier for said planetary pinion gears, a spur gear surrounding said driving and clutch hubs meshing with said planetary pinion gears and fixed to said front wall of said clutch plate carrier, said pinion gear carrier having rotatable supports on said driving hub and said front wall, and brake mechanism to hold said carrier stationary to secure reverse drive.

10. Reversing mechanism including the combination of aligned driving and driven shafts, a clutch hub connected with said driving shaft, a clutch plate carrier connected with said driven shaft, meshing clutch plates carried by said hub and carrier respectively, clutch operating mechanism located in the rear of said clutch hub having clutch plate operating means extended forwardly into said carrier, planetary gearing connecting said shaft for reverse drive disposed forwardly of said clutch plate carrier including a spur gear connected with said driving shaft, a pinion gear carrier surrounding said spur gear, pinion gears carried by said carrier meshing with said spur gears, a second spur gear connected to said clutch plate carrier and meshing with said pinion gears, and means to hold said pinion gear carrier stationary to set the gearing for reverse drive.

11. Reversing mechanism including the combination of aligned driving and driven shafts, planetary gearing connecting said shafts for reverse drive, and clutch mechanism directly connecting said shafts for forward drive, a driving member connected with said driving shaft and having separate means which separately drive said gearing and said clutch mechanism, and a disconnectible driving connection between said separate means.

12. Reversing mechanism including the combination of aligned driving and driven shafts, a driving member fixed to said driving shaft having a spur gear, reversing pinion gears meshing with said spur gear, a loose carrier for said pinion gears, a clutch plate carrier fixed to said driven shaft, a clutch plate hub, inter-engaging clutch plates carried by said hub and carrier, means providing an axially disconnectible driving connection between said driving member and clutch plate hub, and a spur gear having a driving connection with said clutch plate carrier and meshing with said pinion gears.

13. Reversing mechanism including the combination of aligned driving and driven shafts, a clutch plate carrier fixed to said driven shaft, a clutch plate hub loose on said driven shaft and restrained from axial movement thereon, inter-engaging clutch plates carried by said carrier and hub, a driving member fixed to said driving shaft, an axially-disconnectible driving connection between said driving member and hub, spur gear teeth on said driving member, a spur gear connected with said clutch plate carrier, and reversing planetary pinion gears meshing with said spur gear teeth, and having an axially-disengageable meshing engagement with said spur gear.

14. Reversing mechanism including the combination of aligned driving and driven shafts, clutch mechanism connecting said shafts for reverse drive including a clutch plate carrier fixed to said driven shaft, sets of cooperating clutch plates located within said carrier, means establishing a disconnectible driving connection between one set of clutch plates and said driving shaft, which connection is adapted to be disconnected axially upon movement of said shafts, reversing mechanism connecting said shafts for reverse drive including a spur gear connected with said driving shaft, planetary gear elements driven by said spur gear, a planetary gear carrier for said planetary gears, and a gear driven by said planetary gears connected with said driven shaft and located normally within said carrier adapted to be moved out of said carrier and out of engagement with said planetary gears upon movement axially of said shafts.

15. Reversing mechanism including the combination of aligned driving and driven shafts, clutch mechanism connecting said shafts directly for forward drive including a clutch plate carrier having spaced front and rear walls, said rear wall being fixed to said driven shaft, sets of cooperating clutch plates located within said carrier, means including a clutch hub located within said carrier and establishing a disconnectible driving connection between one set of clutch plates and said driving shaft, reversing gearing connecting said shafts for reverse drive including a spur gear fixed to said driving shaft, planetary pinion gears meshing with said spur gear, a carrier for said pinion gears, a spur gear disposed within and meshing with said planetary pinion gears and having a driving connection with said front plate of said clutch plate carrier, said pinion gear carrier having front and rear end plates which are rotatably supported respectively upon a part of said driving shaft and said front wall of said clutch plate carrier, said rear wall of said pinion gear carrier having a passage therethrough which is larger than said last named spur gear whereby said spur gear can be withdrawn from its aforesaid operative position by movement axially of said shafts.

16. Reversing mechanism including the combination of aligned driving and driven shafts, clutch mechanism connecting said shafts directly for forward drive including a clutch plate carrier having a rear wall fixed to said driven shaft and a front wall spaced from said rear wall, sets of cooperating clutch plates located within said carrier, one set having a driving engagement with said carrier, a clutch hub rotatable on said driven shaft and located in part within said carrier and having a driving engagement with the other set of clutch plates, a driving hub fixed to said driving shaft, said driving and clutch hubs having normally inter-engaging clutch teeth which establish a driving connection therebetween, said clutch teeth being disconnectible upon axial movement of said driven shaft, clutch operating mechanism disposed in the rear of said clutch plate carrier including a sleeve which is axially movable on said driven shaft, thrust pins slidably extended through the rear wall of said clutch plate carrier in pressure-applying position with said clutch plates, link mechanism connecting said pins and sleeve, and reversing gearing connecting said shafts for reverse drive including a pinion gear carrier having front and rear walls which are journalled respectively on said driving hub and said front wall of said cluch plate carrier, planetary pinion gears carried by said gear carrier, said driving hub having spur gear teeth meshing with at least some of said planetary pinion gears, a spur gear located within said carrier and said planetary pinion gears and meshing with some of said pinion gears having a driving connection with said front wall of said clutch plate carrier, the rear wall of said pinion carrier having a passage therethrough which is larger than said spur gear whereby said spur gear can be withdrawn axially from its aforesaid opertive position, and brake mechanism to hold said planetary pinion carrier stationary to secure reverse drive.

17. Reversing mechanism including the combination of aligned driving and driven shafts, a clutch plate carrier fixed to the driven shaft, a driving member rotatable with said driving shaft extended into said clutch plate carrier, clutch plates connected with said driving member and carrier, mechanism for effecting driving engagement of said plates whereby to set the mechanism for forward drive, a loose pinion gear carrier surrounding said driving member, reversing pinion gears carried thereby, a spur gear carried by said driving member meshing with some of said pinion gears, a second spur gear surrounding and free from said driving member meshing with others of said pinion gears, and a driving connection between said second spur gear and said driven shaft.

18. Reversing mechanism including the combination of aligned driving and driven shafts, a clutch plate carrier fixed to the driven shaft, a driving member rotatable with said driving shaft extended into said clutch plate carrier, clutch plates connected with said driving member and carrier, mechanism for effecting driving engagement of said plates whereby to set the mechanism for forward drive, a loose pinion gear carrier surrounding said driving member, reversing pinion gears carried thereby, a spur gear carried by said driving member meshing with some of said pinion gears, a second spur gear surrounding and free from said driving member meshing with others of said pinion gears, and a driving connection between said second spur gear and said clutch plate carrier located between said pinion gear and clutch plate carriers.

In testimony whereof, I have signed my name to this specification.

CHARLES J. ROBERTSON.